United States Patent Office 3,156,438
Patented Nov. 10, 1964

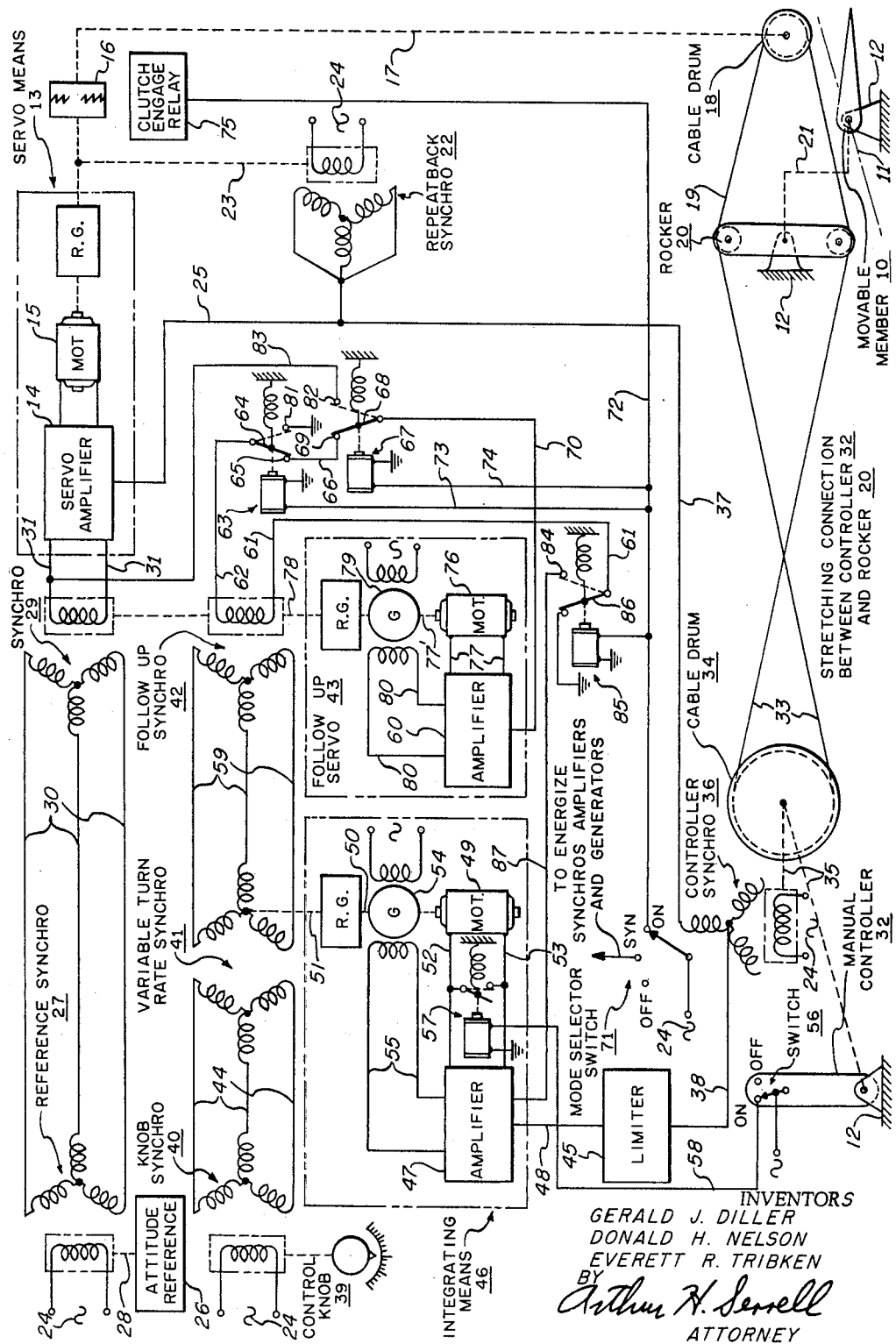

3,156,438
MANUALLY CONTROLLED SERVO SYSTEM
Gerald J. Diller, Phoenix, and Donald H. Nelson and Everett R. Tribken, Scottsdale, Ariz., assignors to Sperry Rand Corporation, Great Neck, N.Y., a corporation of Delaware
Filed Oct. 12, 1962, Ser. No. 230,209
12 Claims. (Cl. 244—83)

This invention relates to a manually controlled servo system for a navigable craft with a member for turning it about an axis in which a mechanical connection between the manually operable controller and the member includes a stretching part that provides the system with the feel characteristics of a centering spring. The improved system operates to change the crafts attitude in relation to its control axis at a turn rate that depends on the force exerted on the controller without requiring the use of a force type pick-off at the controller or the conventionally employed differential centering spring connection between the controller and craft. As force is applied to the controller in the improved system, relative displacement occurs between the included movable synchro parts respectively connected to the controller and member in accordance with the stretch in the stretching part of the mechanical connection between the controller and member. The stretch in the provided mechanical connection is proportional to the force applied to the controller and the output of the related connected synchros is accordingly dependent in magnitude and sense on the magnitude and direction of the force applied.

An object of the present invention is to obviate the need of force pick-offs or spring centering mechanisms for the manual controller in systems of the character described.

One of the features of the present invention resides in the inclusion in the system of a mechanical connection between the controller and craft turning member having a stretching part.

Another feature of the invention resides in the inclusion in the force output means of the system of synchros with relatively displaceable parts, one of which is operatively connected to the manually operable controller component and the other of which is operatively connected to the craft turning member.

A further feature of the invention resides in the inclusion in the force output means of the system of a displacement data transmission line in which the controller connected synchro and the member connected synchro are connected in opposed relation.

Another feature of the invention resides in the inclusion in the force output means of the system of a means for integrating the output of the transmission line that includes a motor and a turn rate synchro with a rotor connected to the motor.

Other objects, features and structural details of the invention will be apparent from the following description when read in connection with the accompanying drawing wherein the single figure shown is a diagrammatic view and circuit diagram of a manually controlled servo system embodying the present inventive concepts.

As shown, the improved servo system is adaptable for use in a navigable craft such as an aircraft in controlling its rate of turn about an axis such as the pitch axis of the craft. Accordingly, a movable surface member 10 or elevators pivoted about axis 11 with relation to a relatively fixed frame 12 operates as a component of the craft to turn it about a related or pitch axis. The improved system effects this result by movement of the member 10 from a null or streamline condition in relation to the craft through operation of a servo means 13 component thereof. As shown, the servo means 13 includes a servo amplifier 14, and a motor 15 responsive to the output of the amplifier 14. The motor 15 is operatively connected to the member 10 by way of its output shaft to a suitable reduction gearing indicated at R.G., from the gearing to a clutch 16 whose faces are engaged when the system is conditioned for operation, from clutch 16 by way of shaft 17 to drum 18, and from the drum to the member 10 by way of cable 19, rocker 20 pivoted to the frame 12 of the craft and shaft 21. Accordingly, when the clutch 16 is engaged, clockwise or counterclockwise motion of the shaft of motor 15 of the servo means 13 results in a corresponding movement of the member 10 or elevators from a null or streamline condition about axis 11.

The repeatback component of the improved system is indicated as a synchro or pick-off 22 whose stator part is fixed to the craft and whose movable part or rotor is operatively connected to the member 10 through a shaft connection 23 to the output shaft of motor 15, by way of the engaged clutch 16, output shaft 17, drum 18, rocker 20 and shaft 21 to provide a repeatback output depending on the angular displacement of the member 10 from a null or streamline condition. As shown, synchro 22 is energized from a suitable source of alternating current power 24 supplied to its rotor. The magnitude and phase of the output of the repeatback synchro 22 fed to the servo amplifier 14 by way of lead 25 are respectively dependent on the extent and sense of the displacement of the member 10 from a null condition as positioned by the servo means 13 of the system.

The improved system further requires an input to the servo means 13 that depends on the angular displacement of the craft from a reference attitude about the axis to which member 10 is related. Where the craft is an aircraft and the pivoted member 10 is an elevator operable to move the craft about its pitch axis, a suitable attitude reference 26 with relation to the pitch axis is included in the system. The craft displacement output means of the system herein provided is accordingly represented as the reference 26 with a reference synchro 27 or pick-off whose movable part or rotor is stabilized by the attitude reference through shaft 28 and whose stator part moves with the craft as it moves about the reference or pitch axis in relation to the provided reference attitude. The rotor of the synchro 27 is energized from source 24 and the output of the reference displacement means is dependent in magnitude and sense to the extent and direction of the angular displacement of the craft from the reference attitude. In the improved system, synchro 27 is connected to servo amplifier 14 as an input element in a data transmission line that includes a synchro 29 arranged in the line in opposed relation to the reference attitude output means. In the described input line to the amplifier 14, the stators of the respective synchros 27 and 29 are connected by leads 30, and the movable part or rotor of the synchro 29 is connected to the amplifier by leads 31. In the operation of the improved system, the rate of rotation of the rotor of synchro 29 establishes the turn rate of the craft about its axis. With an initial input to the servo means 13 from the synchro 29 in the input line, member 10 is displaced in a direction from a null condition corresponding to the direction of rotation of the synchro rotor so that the craft starts to move about its axis. When the craft's turn rate matches that established by the synchro 29, the synchro 27 provides an equal opposing input to the line that balances the synchro 29 output at a constant value and holds the member 10 displaced from null condition under the influence on servo means 13 of the output of the repeatback synchro 22. The turn proceeds with member 10 in displaced condition at the established rate until the rotation of the rotor of synchro 29 is stopped. When this occurs the member 10 is moved by servo means 13 from the synchro 27 output in a reverse direction to that initially established to bring the craft out of the turn in cooperation with the repeatback synchro 22. The displacement of the rotor of synchro 29 from a null after operation requires the system to displace the member 10 at such times from a null condition to maintain the changed attitude of craft with respect to the reference 26 so that there is a balance between the output of the line including synchros 27 and 29 and the output of the repeatback synchro 22. Reverse operation of the system turns the rotor of synchro 29 in the opposite direction to establish the craft at a different attitude depending on its relation to the reference 26.

The manually operable component of the improved system is indicated as a controller 32 in the form of a stick that is pivoted at one of its ends on the frame 12 of the craft. To obtain the feel characteristics of a centering spring in the improved system, the mechanical connection between the controller 32 and the member 10 moved by the servo means 13 includes a stretching part designated as cable 33 providing a stretching connection between a cable drum 34 moved by controller 32 through shaft 35 and the rocker 20 connected to move member 10 through shaft 21. The member or elevator 10 is accordingly connected to the manually operable controller 32 through mechanical means having cooperative drum and cable parts. The stretch in the cable or other stretching component between the connected elements is proportional to the force exerted on the controller 32 by the human pilot in commanding the turn by the relative angular displacement of the controller shaft 35 in relation to the initially stationary shaft 17 to which the rotor of the repeatback synchro is operatively connected. The force output means of the improved system includes a displacement synchro 36 or pick-off whose stator part is fixed to the craft and whose movable part or rotor is operatively connected to the controller through shaft 35. The displacement data transmission line with lead 37 connecting the respective stators of the repeatback and controller synchros 22, 36 provides a connecting means between the components having an output that depends on the force exerted on the controller 32 to stretch the stretching part of the mechanical connection and relatively angularly displace the parts of the synchros connecting the controller 32 and the member 10. The synchros 22 and 36 in the line portion of the force output means of the system are connected in opposed relation so that during operation of the system as the member 10 moves, the controller 32 moves through an equivalent angle without influencing the relative angular displacement between the components or the force required to maintain the displacement. In controlling the turn rate of the craft about its axis through the synchro 29, the human operator maintains a desired proportional force on the controller 32 while feeling the movements of the member 10 as the system functions in response to the servo means 13 through the stretching connection. As a result of the relative angular displacement obtained between the rotors of the line synchros 36, 22 when force is exerted on the controller 32, the line provides the necessary force output at lead 38 connected to one side of the stator of the controller synchro 36 for the required operation of the rotor of synchro 29.

As shown, the improved system is incorporated in an automatic pilot for the purpose of synchronizing the system with the rotor of synchro 29 at a correct null in relation to the member 10 and controller 32 as well as provide an alternate use for the synchro 29 where the attitude of the craft with respect to the reference 26 may be controlled by locating the synchro rotor in accordance with the setting of a control knob 39 component of the automatic pilot. Accordingly, the embodiment of the invention shown in the drawing includes a data transmission line for controlling the operation of the rotor of synchro 29 having knob synchro 40 or pick-off, variable turn rate synchro 41 or pick-off, and follow-up synchro 42 or pick-off components. The rotor of synchro 40 is energized from source 24 and is positioned in accordance with the setting of the control knob 39 which is indicated at its null setting so that no output is provided from the line to the follow-up servo 43 from the synchro 40. The stator of synchro 40 is connected to the stator of the variable turn rate synchro 41 by way of leads 44.

In accordance with the teaching of the present invention, the rotor of synchro 41 is rotated at a speed and in a direction that is dependent on the magnitude and sense of the force output provided on lead 38 from synchro 36 in the force output line. The force output means of the improved system, limits the magnitude of the output of the force line by including means for limiting the output of the line in the form of a suitable limiter as indicated at 45 that is connected to lead 38. The means also includes an integrated means indicated at 46 with an amplifier 47 connected to receive the output of the force line from limiter 45 by way of lead 48. The integrating means provided further includes a motor 49 driven by the output of the amplifier 47 and connected to the rotor of the variable turn rate synchro or pick-off 41 through shaft 50, reduction gearing R.G. and shaft 51. Leads 52 and 53 connect the motor 49 to the amplifier 47. Close speed regulation of the motor 49 is obtained by a feedback input to the amplifier 47 from a generator 54 by way of leads 55. Under conditions where it is not desirable to use the controller 32, the system may be disabled by the human pilot by shorting the input leads to the motor 49 through operation of a control switch 56 at the controller 32 to break the circuit from the source 24 to the coil of a relay 57 by way of lead 58 so as to permit the spring biased armature of the relay to return to a contact engaging position in which it connects the leads 52 and 53. With the contact blade of switch 56 located in its on position as indicated in the drawing, the coil of the relay 57 is energized, and the system is conditioned for operation by the manually operable controller 32.

In the improved system, the moving part or rotor of the variable turn rate synchro or pick-off 41 is connected to the stator of the follow-up synchro or pick-off 42 by way of leads 59. The follow-up servo 43 for the line including the synchros, 40, 41 and 42 includes an amplifier 60 that receives the output of the line from the rotor of the synchro 42 by way of lead 62, a relay 63 whose energized coil engages its armature 64 and contact 65, lead 66, a relay 67 whose energized coil engages its armature 68 and contact 69 and lead 70. The coils of the respective relays 63 and 67 are energized from source 24 through a mode selector switch 71 whose blade when set in the indicated on position closes a circuit to the coil of the first relay by way of leads 72 and 73 and closes a circuit to the coil of the second relay by way of the leads 72 and 74. In the on position of switch 71, energy is also supplied from the source by way of lead 72 to a clutch engage relay 75 so that the faces of clutch 16 are engaged and a connection is established between the servo means 13 and member or elevator 10. The servo 43 also includes a motor 76 that is controlled by the output of amplifier 60 by way of leads 77. The motor 76 drives the rotors of the respective synchros 42 and 29 through output shaft 77', reduction gearing R.G., and shaft 78. Feedback for close regulation of the speed of the motor 76 is also provided from a generator 79 on shaft 77' whose output is fed to the amplifier 60 by way of leads 80. In the provided force output means, the motors 49 and 76 of the respective integrating means 46 and follow-up servo means control the rotation of the respective driven parts of the synchros 41 and 29 at the same speed and in the same direction depending on the force exerted on the controller 32 and the direction in which the force is exerted. In order to maintain the feel characteristics of system substantially uniform as displacement of the controller 32 from its center or null position occurs, the gradients provided for the respective controller and repeatback synchros 36 and 22 of the force output means are approximately equal. For a given push or pull force exerted on the roller 32, the angular displacement between the rotors of the combined synchros remains approximately the same so that the output of the force line is independent of the position of the controller with respect to its center or null condition. The limiter 45 provided in the system confines the speed of the rotor of synchros 29 to a value that prevents the craft from turning about its axis at a rate that is above its structural limitations.

The components of the improved system are synchronized for operation with the blade of the mode selector switch 71 in the indicated synchronizing position where the circuit is broken between source 24 and the coils of the respective relays 63, 67, 75 and a relay 85. In the synchronizing mode, the spring biased armature 64 of relay 63 engages a grounded contact 81, the spring biased armature 68 of relay 67 engages a contact 82 connected by lead 83 to lead 31, the spring biased armature 86 of relay 85 engages a contact 84 connecting amplifier 47 to synchro 42 by way of leads 61 and 87, and the unenergized relay 75 operates to disengage the faces of the clutch 16 separating the servo means 13 from the member 10. Also in this operation, the controller 32 is approximately centered with no force being exerted thereon, the member 10 is located at an approximate null or streamline condition, and the attitude of the craft is unchanging and approximately corresponding to the reference attitude provided by the attitude reference. Here, any output from the line including synchros 27 and 29 is supplied as an input to servo amplifier 60 by way of leads 31, lead 83, relay armature 68 and lead 70 to operate motor 76 so that the rotor of the synchro 29 of the system is driven to null. Motor 15 of servo means 13 is simultaneously responsive to the output of the same line to drive the rotor of the repeatback syncho 22 to null. This synchronizes the synchros 29 and 27 of the system with respect to one another and determines the null for the system when it is restored to operative condition with the mode switch 71 in the on indicated position. Any output from the line including synchros 40, 41 and 42 is supplied as an input to amplifier 47 by way of lead 61, relay armature 86 and lead 87 to operate motor 49 so that synchro 41 is rotated until the rotor of synchro 42 is nulled.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A manually controlled servo system for a navigable craft having a movable member for turning it about an axis including means for providing an output depending on the angular displacement of the craft from reference attitude in relation to the axis, a synchro with a part fixed to the craft and a movable part operatively connected to the member providing a repeatback output depending on the angular displacement of the member from a null condition with respect to the craft, a manually operable controller, a mechanical connection between the controller and member with a stretching part providing the system with the feel characteristics of a centering spring, a synchro with a part fixed to the aircraft and a movable part operatively connected to the controller, means connecting the controller synchro and repeatback synchro providing an output depending on the force exerted on the controller to stretch the stretching part of the mechanical connection and relatively angularly displace the controller and member connected synchro parts, and servo means connected to the member responsive to the combined outputs of the attitude output means, the force output means and the repeatback output means operable to turn the craft about the axis at a rate depending on the force exerted on the controller.

2. A system of the character claimed in claim 1, in which movable parts of the respective repeatback and controller synchros are rotors, and the force output means includes a displacement data transmission line in which the controller synchro and repeatback synchro are connected in opposed relation.

3. A system of the character claimed in claim 2, in which the force output means includes means for limiting the output of the data transmission line.

4. A system of the character claimed in claim 2, in which the force output means includes an integrating means having a motor driven by the output of the line, and a turn rate synchro with a rotor connected to the motor.

5. A system of the character claimed in claim 2, in which the force output means includes an integrating means with a motor driven by the output of the line, a synchro with a rotor connected to the integrating motor and a follow-up servo responsive to the output of the synchro having a synchro arranged in the system in opposed relation to the reference attitude output means.

6. A system of the character claimed in claim 1, in which the stretching part of the mechanical connection between the controller and member is a cable whose stretch is proportional to the force exerted on the controller.

7. A manually controlled servo system for an aircraft having elevators and a pitch axis including means for providing a pitch output depending on the angular displacement of the craft about the axis in relation to a pitch reference attitude, a pick-off having a stator fixed to the aircraft and a rotor operatively connected to the elevators providing a repeatback output depending on the angular displacement of the elevators from a streamline condition with respect to the aircraft, a manually operable controller, mechanical means connecting the controller and elevators having cooperative drum and stretching cable parts, a pick-off with a stator fixed to the aircraft and a rotor operatively connected to the controller, means connecting the controller and repeatback pick-offs providing an output depending on the force exerted on the controller to stretch the cable of the means connecting the controller and elevators and relatively angularly displace the rotors of the respective controller and repeatback pick-offs, and servo means operatively connected to the elevators responsive to the combined outputs of the attitude reference means, the force output means and repeatback pick-off operable to move the craft about the axis at a rate depending on the force exerted on the controller.

8. A system of the character claimed in claim 7, in which the force output means includes a displacement data transmission line in which the controller pick-off and repeatback pick-off are connected in opposed relation.

9. A system of the character claimed in claim 8, in which the force output means includes means for limiting the output of the data transmission line.

10. A system of the character claimed in claim 8, in which the force output means includes integrating means having a motor driven by the output of the line, and a turn rate pick-off with a rotor connected to the motor.

11. A system of the character claimed in claim 8, in which the force output means includes integrating means with a motor driven by the output of the line, a pick-off having a rotor connected to the integrating motor, and a follow-up servo responsive to the output of the integrating pick-off having a pick-off arranged in the system in opposed relation to the pitch reference output means.

12. In a manually controlled servo system for a navigable craft having a movable member for turning it about an axis, a synchro with a part fixed to the craft and a movable part operatively connected to the member, a manually operable controller, a mechanical connection between the controller and member with a stretching part, a synchro with a part fixed to the craft and a movable part operatively connected to the controller, a data transmission line connecting the synchros in opposed relation providing an output depending on the force exerted on the controller to stretch the stretching part of the mechanical connection and relatively displace the controller and member connected synchro parts, and servo means responsive to the output of the line operatively connected to the member.

References Cited in the file of this patent

UNITED STATES PATENTS 2,451,263     Webb  ---------------- Oct. 12, 1948